US012638136B2

(12) United States Patent
Segawa et al.

(10) Patent No.: US 12,638,136 B2
(45) Date of Patent: May 26, 2026

(54) HYDROGEN STORAGE SYSTEM, CONTROL DEVICE, AND CONTROL METHOD

(71) Applicants: SHIMIZU CORPORATION, Tokyo (JP); NATIONAL INSTITUTE OF ADVANCED INDUSTRIAL SCIENCE AND TECHNOLOGY, Tokyo (JP)

(72) Inventors: Yuta Segawa, Tokyo (JP); Eisuke Shimoda, Tokyo (JP); Naruki Endo, Tsukuba (JP); Tetsuhiko Maeda, Tsukuba (JP)

(73) Assignees: SHIMIZU CORPORATION, Tokyo (JP); NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 0 days.

(21) Appl. No.: 18/851,901

(22) PCT Filed: Mar. 30, 2023

(86) PCT No.: PCT/JP2023/013406

§ 371 (c)(1),
(2) Date: Sep. 27, 2024

(87) PCT Pub. No.: WO2023/190996

PCT Pub. Date: Oct. 5, 2023

(65) Prior Publication Data

US 2025/0369573 A1 Dec. 4, 2025

(30) Foreign Application Priority Data

Mar. 30, 2022 (JP) ................................ 2022-055838

(51) Int. Cl.
*F17C 11/00* (2006.01)
*F17C 5/00* (2006.01)
*F17C 5/06* (2006.01)

(52) U.S. Cl.
CPC ............ *F17C 11/005* (2013.01); *F17C 5/002* (2013.01); *F17C 5/06* (2013.01); *F17C 2260/023* (2013.01)

(58) Field of Classification Search
CPC .............. F17C 2221/012; F17C 11/005; F17C 2260/022; F17C 2260/023
See application file for complete search history.

(56) References Cited

U.S. PATENT DOCUMENTS

2006/0180235 A1 8/2006 Kubo et al.
2008/0044704 A1 2/2008 Kubo et al.
2016/0195219 A1 7/2016 Cort et al.

FOREIGN PATENT DOCUMENTS

JP 2005069333 A 3/2005
JP 2006096174 A 4/2006
(Continued)

OTHER PUBLICATIONS

JP2005-187280A and machine translation (Year: 2025).*
International Search Report corresponding to International Application No. PCT/JP2023/013406 dated Jun. 2, 2023.

*Primary Examiner* — Timothy P. Kelly
(74) *Attorney, Agent, or Firm* — Hoffmann & Baron, LLP

(57) ABSTRACT

A hydrogen storage system including a plurality of alloy tanks that absorb hydrogen gas and a control device that controls filling of the plurality of alloy tanks with the hydrogen gas, in which the control device alters timings of initiating the filling with the hydrogen gas among the plurality of alloy tanks. Therefore, the hydrogen storage system is capable of suppressing a required cooling capacity.

5 Claims, 4 Drawing Sheets

(56) References Cited

FOREIGN PATENT DOCUMENTS

| | | | |
|---|---|---|---|
| JP | 2006179441 | A | 7/2006 |
| JP | 2008039108 | A | 2/2008 |
| JP | 2010127374 | A | 6/2010 |
| JP | 2020170691 | A | 10/2020 |

* cited by examiner

HYDROGEN STORAGE SYSTEM, CONTROL DEVICE, AND CONTROL METHOD

CROSS-REFERENCE TO RELATED APPLICATIONS

This application is a U.S. National Phase application of International Application No. PCT/JP2023/013406, filed Mar. 30, 2023, which claims priority to Japanese Patent Application No. 2022-055838, filed Mar. 30, 2022, the disclosures of which are incorporated herein by reference.

TECHNICAL FIELD

The present invention relates to a hydrogen storage system, a control device, and a control method.

BACKGROUND ART

When hydrogen is absorbed into a hydrogen-absorbing alloy, heat of reaction is generated, and there is thus a need to cool the hydrogen-absorbing alloy (for example, refer to Patent Document 1). For example, at the time of filling a hydrogen-absorbing alloy with hydrogen from a mobile hydrogen cylinder, a large amount of heat of reaction is generated.

CITATION LIST

Patent Document

Patent Document 1: Japanese Unexamined Patent Application, First Publication No. 2020-170691

SUMMARY OF INVENTION

Technical Problem

However, when the temperature of the hydrogen-absorbing alloy increases, since the amount of hydrogen that can be absorbed decreases, in a case where a large amount of hydrogen is stored in a hydrogen-absorbing alloy tank from a hydrogen cylinder or the like, there is a problem in that a cooling system for the hydrogen-absorbing alloy tank having a large cooling capacity is required to remove a large amount of heat of reaction.

The present invention has been made in consideration of such a circumstance and provides a hydrogen storage system, a control device, and a control method that are capable of suppressing a required cooling capacity.

Solution to Problem

This invention has been made to solve the above-described problem, and one aspect of the present invention is a hydrogen storage system including a plurality of alloy tanks that absorb hydrogen gas and a control device that controls filling of the plurality of alloy tanks with the hydrogen gas, in which the control device alters timings of initiating the filling with the hydrogen gas among the plurality of alloy tanks.

In addition, a different aspect of the present invention is the above-described hydrogen storage system, in which the control device interrupts the filling of the plurality of alloy tanks with the hydrogen gas when a temperature of a heat medium that has cooled the plurality of alloy tanks exceeds a predetermined threshold.

In addition, a different aspect of the present invention is the above-described hydrogen storage system, in which the control device initiates the filling of a different alloy tank with the hydrogen gas during the filling of one of the plurality of alloy tanks with the hydrogen gas.

In addition, a different aspect of the present invention is the above-described hydrogen storage system, in which the control device initiates the filling of a different alloy tank with the hydrogen gas after the filling of one of the plurality of alloy tanks with the hydrogen gas is finished.

In addition, a different aspect of the present invention is a control device that controls filling of a plurality of alloy tanks that absorb hydrogen gas with the hydrogen gas, in which timings of initiating the filling with the hydrogen gas are altered among the plurality of alloy tanks.

In addition, a different aspect of the present invention is a control method for controlling filling of a plurality of alloy tanks that absorb hydrogen gas with the hydrogen gas, in which timings of initiating the filling with the hydrogen gas are altered among the plurality of alloy tanks.

Advantageous Effects of Invention

According to this invention, it is possible to suppress a required cooling capacity in a hydrogen storage system.

DESCRIPTION OF EMBODIMENTS

First Embodiment

Figure 1:
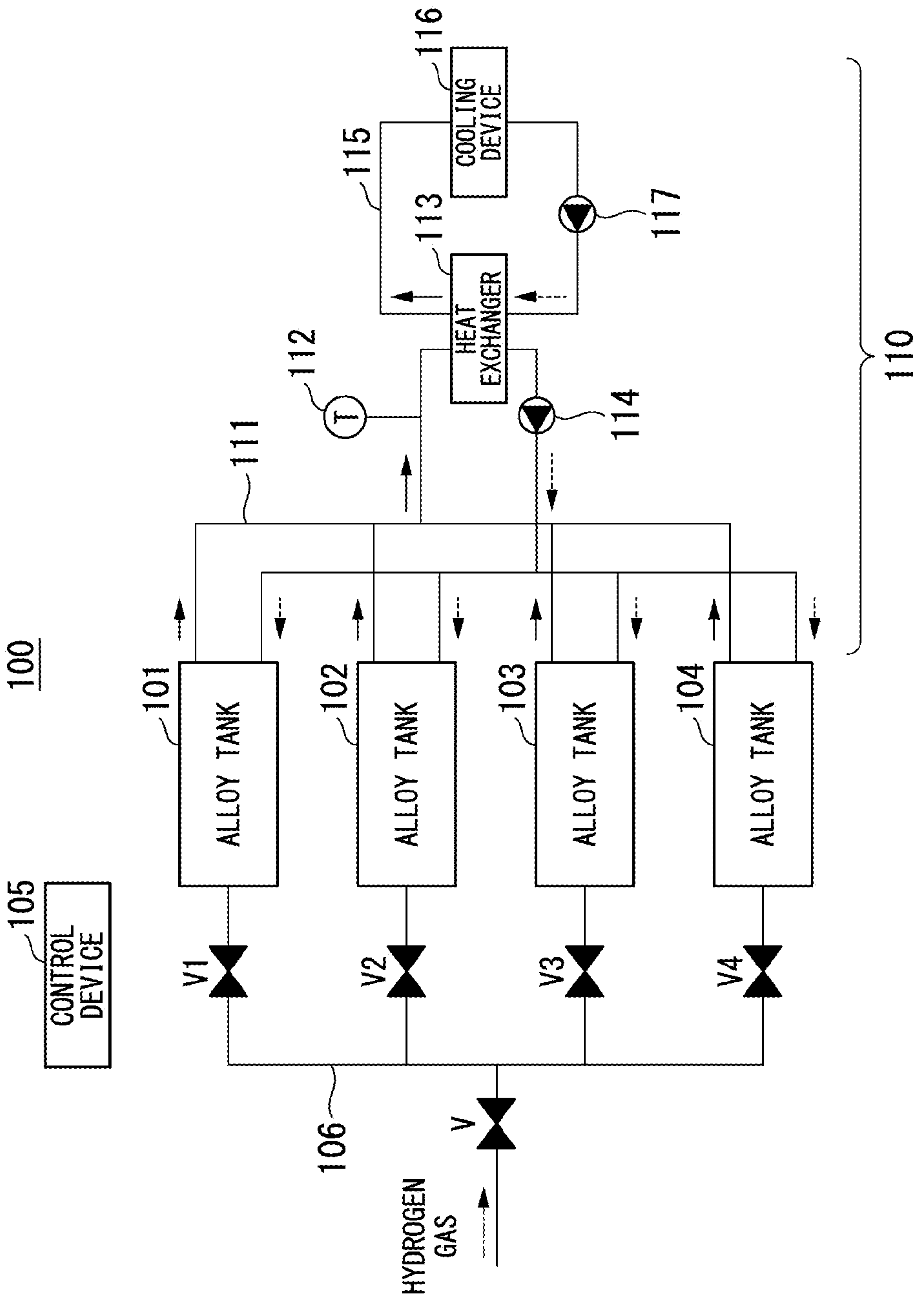
FIG. 1 A schematic block diagram representing the configuration of a hydrogen storage system 100 according to one embodiment of this invention.

Hereinafter, an embodiment of the present invention will be described with reference to the drawings. FIG. 1 is a schematic block diagram representing the configuration of a hydrogen storage system 100 according to one embodiment of this invention. The hydrogen storage system 100 is a system that stores hydrogen to be supplied to a fuel cell or the like using a hydrogen-absorbing alloy. The hydrogen storage system 100 includes alloy tanks 101, 102, 103, and 104, a control device 105, a hydrogen gas pipe 106, valves V, V1, V2, V3, and V4, and a tank cooling system 110. Each of the alloy tanks 101, 102, 103, and 104 has a hydrogen-absorbing alloy and absorbs the hydrogen gas into the hydrogen-absorbing alloy. The control device 105 controls filling of the alloy tanks 101, 102, 103, and 104 with the hydrogen gas. The control device 105 alters the timings of initiating the filling with the hydrogen gas among the alloy tanks 101, 102, 103, and 104.

The hydrogen gas pipe 106 is a pipe for filling the alloy tanks 101, 102, 103, and 104 with the hydrogen gas from a hydrogen cylinder storing the hydrogen gas. The hydrogen cylinder is connected to one end of the hydrogen gas pipe 106. The other end of the hydrogen gas pipe 106 is branched and connected to the alloy tanks 101, 102, 103, and 104. In a portion before the hydrogen gas pipe 106 is branched, the valve V is installed. In a portion where the hydrogen gas pipe 106 is branched and connected to the alloy tank 101, the valve V1 is installed, in a portion where the hydrogen gas pipe 106 is connected to the alloy tank 102, the valve V2 is installed, in a portion where the hydrogen gas pipe 106 is connected to the alloy tank 103, the valve V3 is installed, and in a portion where the hydrogen gas pipe 106 is connected to the alloy tank 104, the valve V4 is installed, respectively. Since the valves V1, V2, V3, and V4 are installed to correspond to the alloy tanks 101, 102, 103, and 104, respectively, it is possible to control whether or not to fill each of the alloy tanks 101, 102, 103, and 104 with the hydrogen gas.

The alloy tanks 101, 102, 103, and 104 emit heat of reaction at the time of absorbing the hydrogen gas. The tank cooling system 110 removes this heat of reaction. The tank cooling system 110 includes a primary heat medium pipe 111, a thermometer 112, a heat exchanger 113, a pump 114, a secondary heat medium pipe 115, a cooling device 116, and a pump 117.

The primary heat medium pipe 111 is a pipe that circulates a heat medium that cools the alloy tanks 101, 102, 103, and 104 between the alloy tanks 101, 102, 103, and 104 and the heat exchanger 113. The thermometer 112 is installed near the inlet of the heat exchanger 113 in the primary heat medium pipe 111 and measures the temperature (the heat exchanger inlet temperature) of the heat medium that flows into the heat exchanger 113. The pump 114 makes the flow of the heat medium in the primary heat medium pipe 111. The heat exchanger 113 performs heat exchange between the heat medium that flows in the primary heat medium pipe 111 and a heat medium that flows in the secondary heat medium pipe 115 and cools the heat medium in the primary heat medium pipe 111. The secondary heat medium pipe 115 is a pipe that circulates a heat medium between the heat exchanger 113 and the cooling device 116. The cooling device 116 cools the heat medium that flows in the secondary heat medium pipe 115. The pump 117 makes the flow of the heat medium in the secondary heat medium pipe 115.

Figure 2:
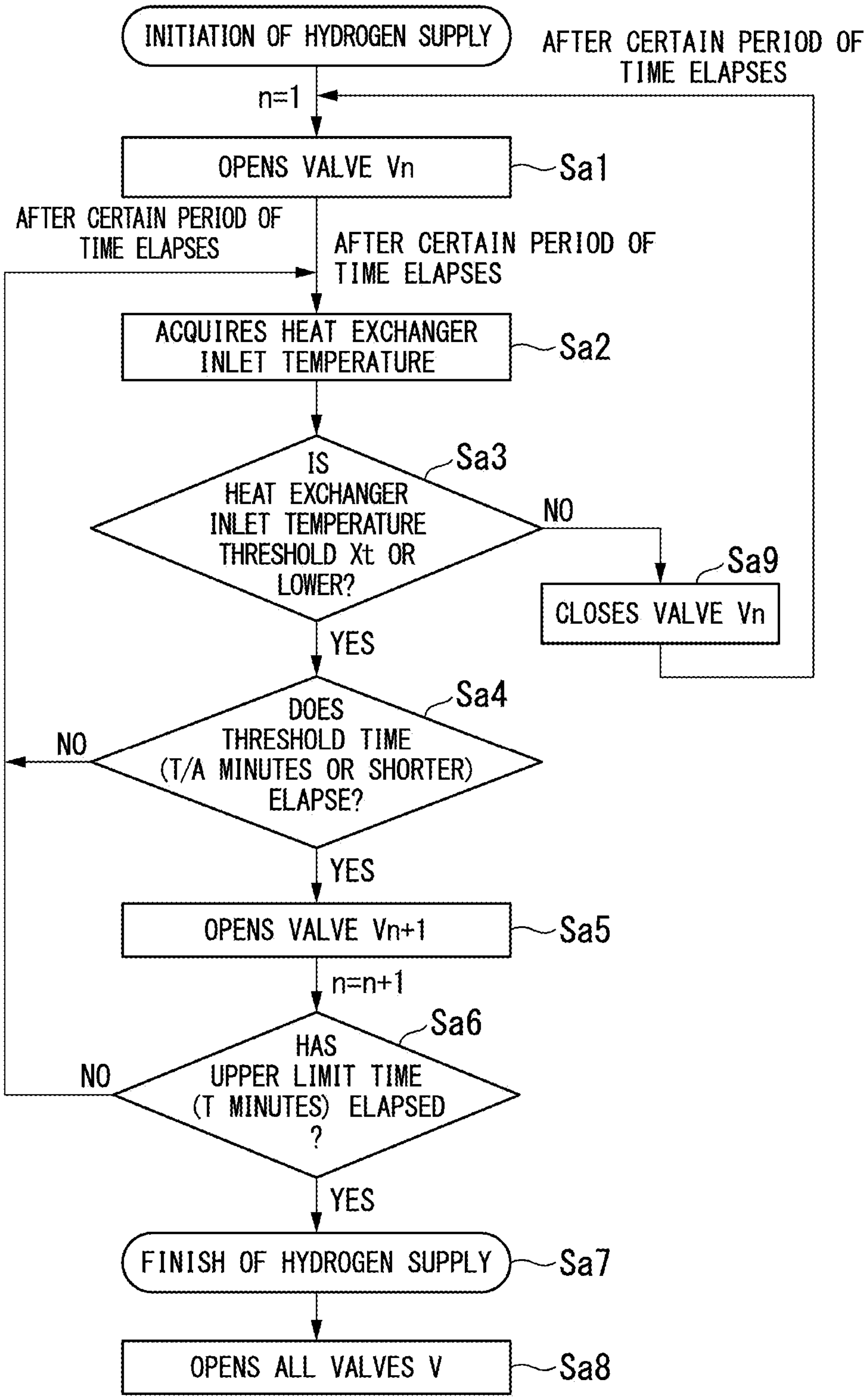
FIG. 2 A flowchart for describing the operation of a control device 105 in the same embodiment.

FIG. 2 is a flowchart for describing the operation of the control device 105 in the present embodiment.

When the hydrogen cylinder is connected to the hydrogen gas pipe 106, the valve V is opened, and the supply of the hydrogen gas is initiated, as n=1, the control device 105 opens the valve Vn (step Sa1). This makes the filling of the alloy tank 101 with the hydrogen gas initiated. After a certain period of time elapses, the control device 105 acquires the heat exchanger inlet temperature measured with the thermometer 112 (step Sa2). Next, the control device 105 determines whether or not the acquired heat exchanger inlet temperature is a threshold Xt or lower (step Sa3). The threshold Xt is a predetermined value and is, for example, a value between 30° C. to 80° C.

When the inlet temperature has been determined not to be the threshold Xt or lower, that is, not to exceed the threshold Xt in the step Sa3, the control device 105 closes the valve Vn (step Sa9) and interrupts the filling, and the treatment returns to the step Sa1 after a certain period of time elapses. On the other hand, when the inlet temperature has been determined to be the threshold Xt or lower in the step Sa3, the control device 105 determines whether or not a predetermined threshold time has elapsed from the opening of the valve Vn (step Sa4). When the threshold time has been determined not to have elapsed in the step Sa4 (step Sa4—No), the treatment returns to the step Sa2 after a certain period of time elapses. On the other hand, when the threshold time has been determined to have elapsed in the step Sa4 (step Sa4—Yes), the control device 105 opens the valve Vn+1 (step Sa5) and adjusts n to n+1. Here, the threshold time is a value smaller than a value obtained by dividing the upper limit value T (for example, two hours) of the total filling time by the number A of the alloy tanks 101, 102, 103, and 104.

Next, the control device 105 determines whether or not the time of the upper limit value T of the total filling time has elapsed from the initiation of the supply of the hydrogen gas (step Sa6). When this time has been determined not to have elapsed in the step Sa6 (step Sa6—No), the treatment returns to the step Sa2 after a certain period of time elapses. On the other hand, when this time has been determined to have elapsed in the step Sa6 (step Sa6—Yes), the control device 105 closes the valve V, finishes the supply of the hydrogen gas (step Sa7) and opens the valves V1, V2, V3, and V4 (step Sa8).

As described above, the valves V1, V2, V3, and V4 are each opened at intervals of the threshold time, and the filling of the alloy tanks 101, 102, 103, and 104 with the hydrogen gas is thus each initiated in intervals of the threshold time. As the condition in the step Sa4, whether or not the threshold time has elapsed is used, but a plurality of the following facts may be combined: whether or not the heat exchanger inlet temperature has a decreasing trend, whether or not the heat exchanger inlet temperature is a certain temperature or lower, or whether or not the threshold time has elapsed together with the above-described fact. In addition, the threshold time may be changed depending on the value of n such that the threshold time becomes longer as the value of n becomes larger.

Figure 3:
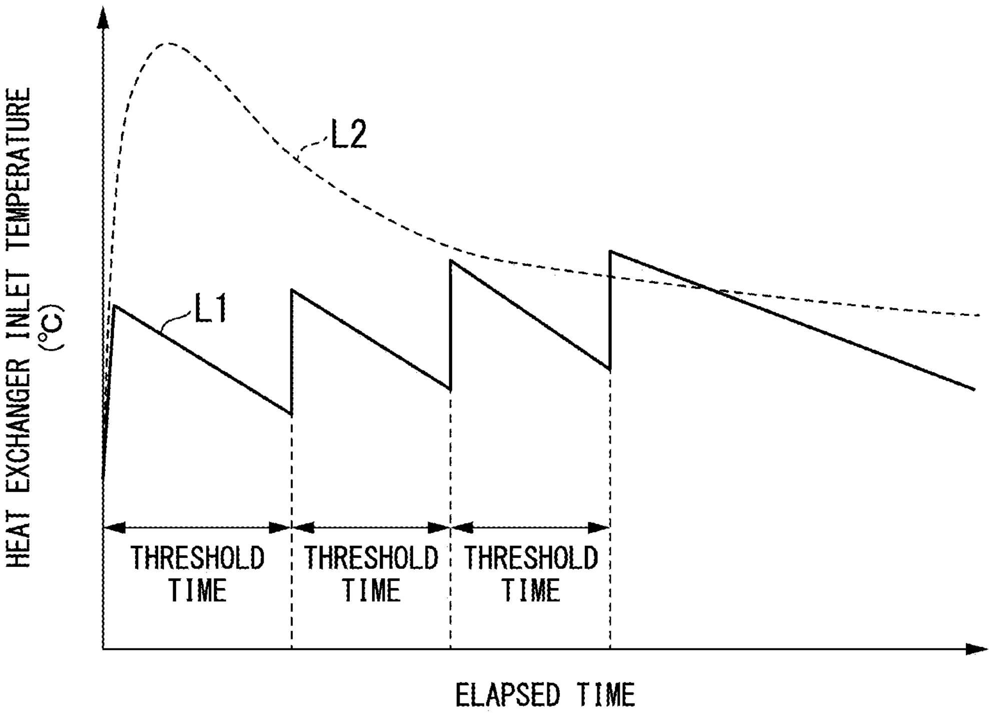
FIG. 3 A graph representing the time transitions of the heat exchanger inlet temperatures in the same embodiment and a comparative example.

FIG. 3 is a graph representing the time transitions of the heat exchanger inlet temperatures in the present embodiment and a comparative example. In the graph of FIG. 3, the horizontal axis indicates the time, and the vertical axis indicates the heat exchanger inlet temperature (° C.). The heat exchanger inlet temperature in the present embodiment is indicated by a graph L1. As shown by the graph L1, the time transition of the heat exchanger inlet temperature in the present embodiment repeats an increase and a decrease every threshold time. A graph L2 for the comparative example indicates the time transition of the heat exchanger inlet temperature in a case where the filling of the alloy tanks 101, 102, 103, and 104 with the hydrogen gas is initiated at the same time. In this case, the temperature abruptly increases immediately after the initiation of the filling. As described above, in the present embodiment, it is possible to suppress an abrupt temperature increase, and it is thus possible to suppress the cooling capacity required for the tank cooling system 110.

Second Embodiment

In the first embodiment, while the valve Vn remains open, the next valve Vn+1 is opened; however, in a second embodiment, the valve Vn is closed and the next valve Vn+1 is then opened. The configuration of the hydrogen storage system 100 in the second embodiment is the same as in FIG. 1. Here, only a part different from the first embodiment will be described.

Figure 4:
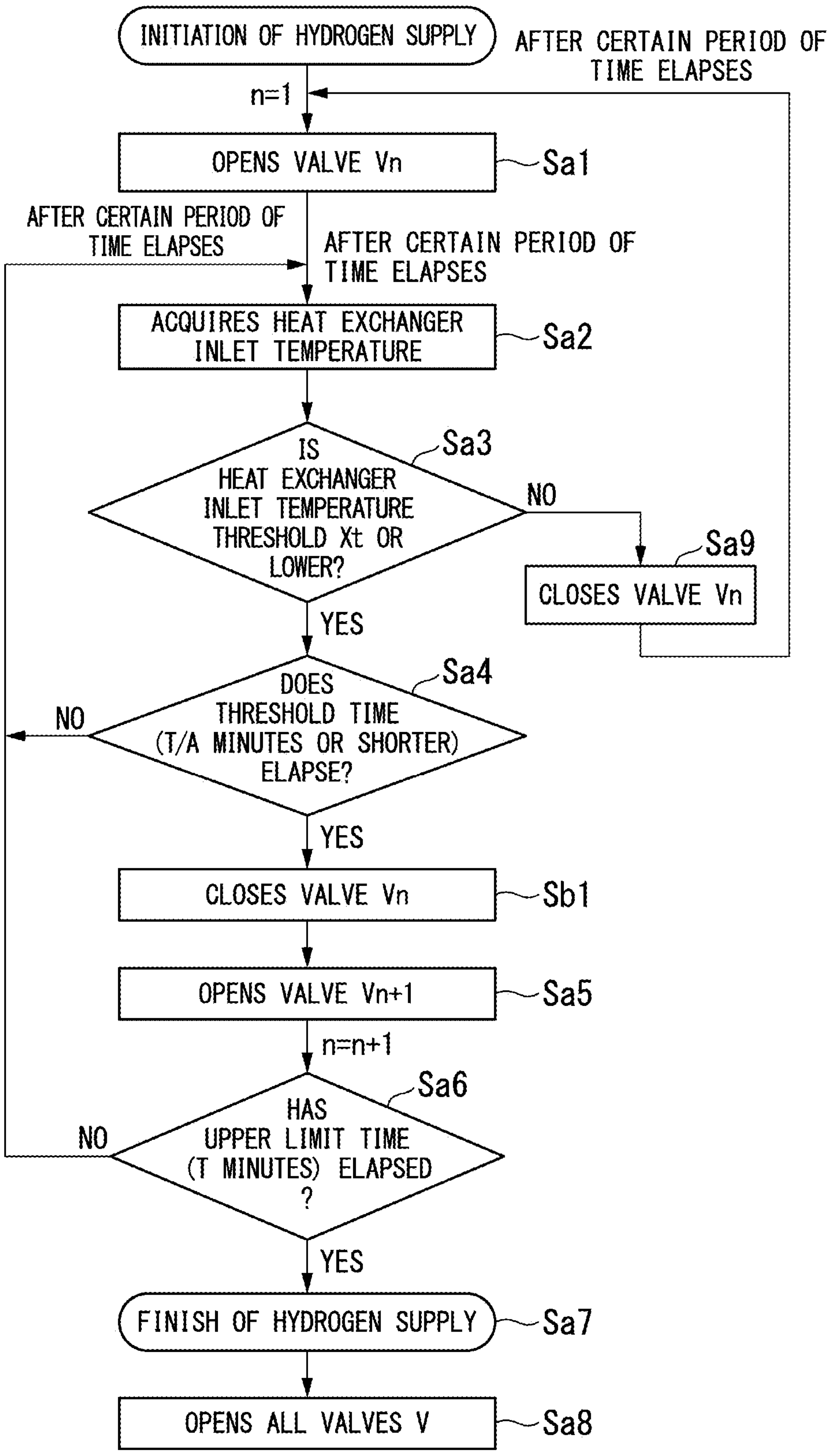
FIG. 4 A flowchart for describing the operation of a control device 105 in a second embodiment of this invention.

FIG. 4 is a flowchart for describing the operation of the control device 105 in the second embodiment of this invention. The flowchart of FIG. 4 is different from FIG. 2 in that a step Sb1 is inserted between the step Sa4 and the step Sa5. In the step Sb1, the control device 105 closes the valve Vn. Even in such a case, it is possible to suppress a temperature increase as in the first embodiment, and it is thus possible to suppress the cooling capacity required for the tank cooling system 110.

In each of the above-described embodiments, the numbers of the alloy tanks 101 to 104 and the valves V1 to V4 are each four, but may not be four as long as the numbers are plural. In addition, each of the alloy tanks 101 to 104 may be composed of a plurality of alloy tanks.

In addition, the control device 105 may also be realized by recording a program for realizing the functions of the control device 105 in FIG. 1 on a computer-readable recording medium and making a computer system read and execute the program recorded in this recording medium. Here, "computer system" includes hardware such as OS or peripherals.

In addition, "computer-readable recording medium" refers to a portable medium such as a flexible disk, an optical magnetic disk, ROM, or CD-ROM or a storage device such as a hard disk that is built into the computer system. Furthermore, "computer-readable recording medium" includes media that dynamically hold programs for a short period of time such as networks such as internet or communication lines in the case of sending programs through a communication line such as a telephone line and media that hold programs for a certain period of time such as volatile memories in servers or computer systems that become clients in the above-described case. In addition, the program may be a program for realizing a part of the above-described functions and, furthermore, may be a program capable of realizing the above-described functions in combination with a program that has been already recorded in the computer system.

Hitherto, the embodiments of this invention have been described in detail with reference to the drawings, but specific configurations are not limited to these embodiments, and design changes and the like within the scope of the gist of this invention are also included in this invention.

REFERENCE SIGNS LIST

100 Hydrogen storage system
101, 102, 103, 104 Alloy tank
105 Control device
106 Hydrogen gas pipe
110 Tank cooling system
111 Primary heat medium pipe
112 Thermometer
113 Heat exchanger
114, 117 Pump
115 Secondary heat medium pipe
116 Cooling device
V, V1, V2, V3, V4 Valve

The invention claimed is:

1. A hydrogen storage system comprising:
a plurality of alloy tanks that absorb hydrogen gas; and
a control device that controls filling of the plurality of alloy tanks with the hydrogen gas,
wherein the control device varies timings of initiating the filling with the hydrogen gas among the plurality of alloy tanks,
the control device initiates filling of a next one of the plurality of alloy tanks with the hydrogen gas a predetermined time after filling of a previous one of the plurality of alloy tanks with the hydrogen gas has been initiated, and
the predetermined time is a time to lower a temperature of a heat medium cooling the previous one of the plurality of alloy tanks.

2. The hydrogen storage system according to claim 1,
wherein the control device interrupts the filling of the plurality of alloy tanks with the hydrogen gas when a temperature of a heat medium that has cooled the plurality of alloy tanks exceeds a predetermined threshold.

3. The hydrogen storage system according to claim 1,
wherein the control device initiates the filling of the next one of the plurality of alloy tanks with the hydrogen gas during the filling of the previous one of the plurality of alloy tanks with the hydrogen gas.

4. The hydrogen storage system according to claim 1,
wherein the control device initiates the filling of the next one of the plurality of alloy tanks with the hydrogen gas after the filling of the previous one of the plurality of alloy tanks with the hydrogen gas is finished.

5. A control device configured to control filling of a plurality of alloy tanks that absorb hydrogen gas with the hydrogen gas,
wherein timings of initiating the filling with the hydrogen gas are varied among the plurality of alloy tanks,
the control device is configured to initiate filling of a next one of the plurality of alloy tanks with the hydrogen gas a predetermined time after filling of a previous one of the plurality of alloy tanks with the hydrogen gas has been initiated, and
the predetermined time is a time to lower a temperature of a heat medium cooling the previous one of the plurality of alloy tanks.

* * * * *